March 12, 1940. I. V. BRUMBAUGH 2,193,055
OVEN AND BURNER THEREFOR
Filed July 21, 1936 3 Sheets-Sheet 1
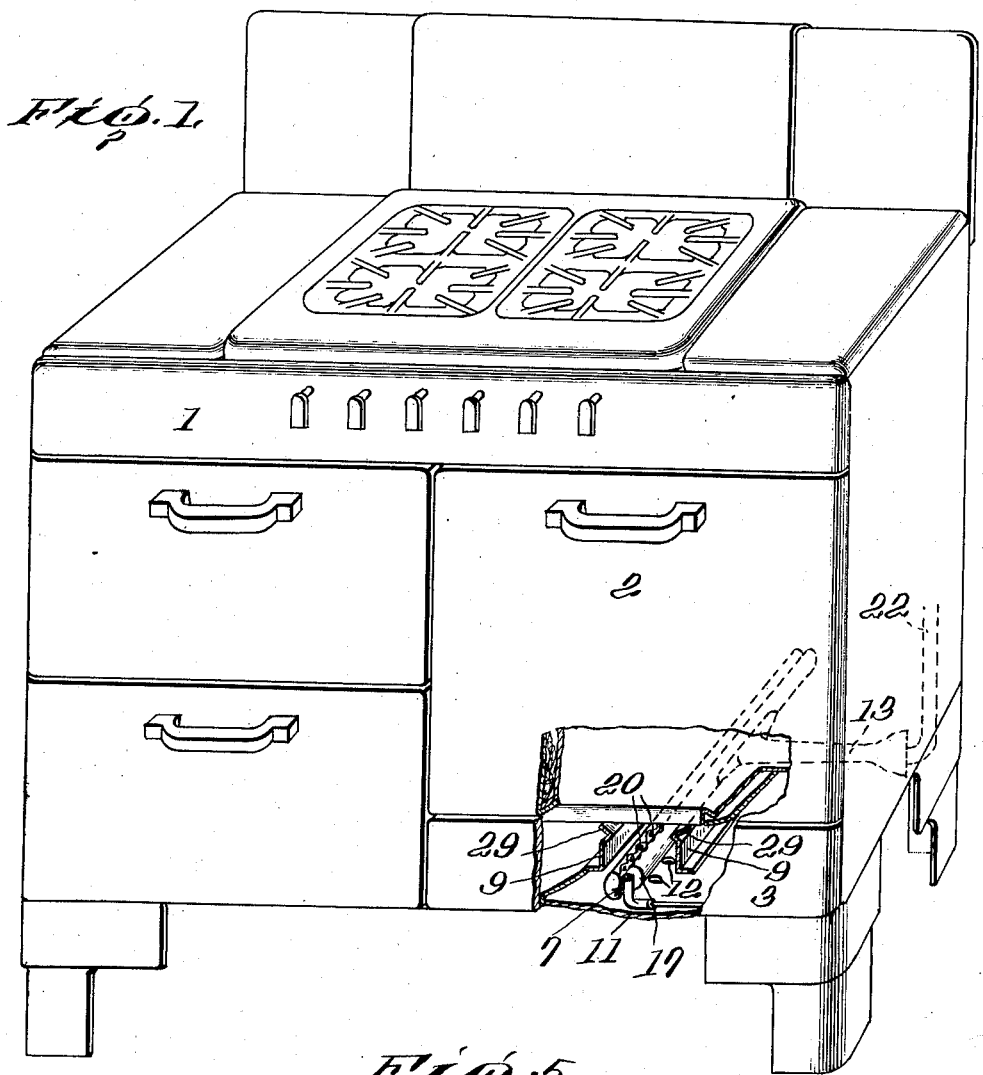
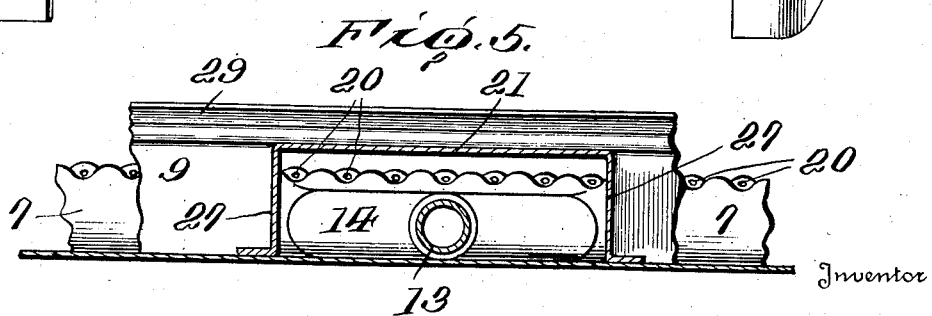

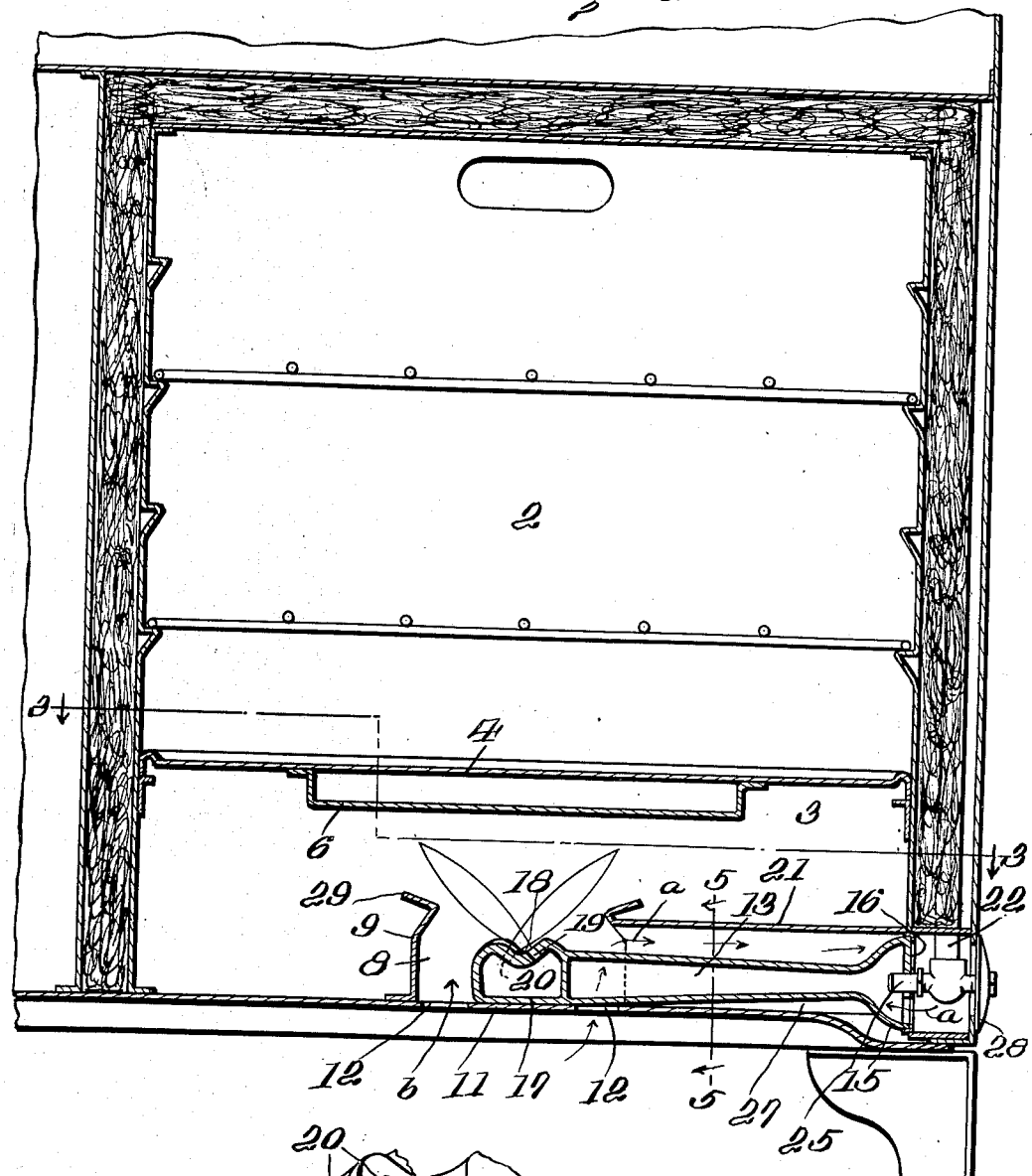

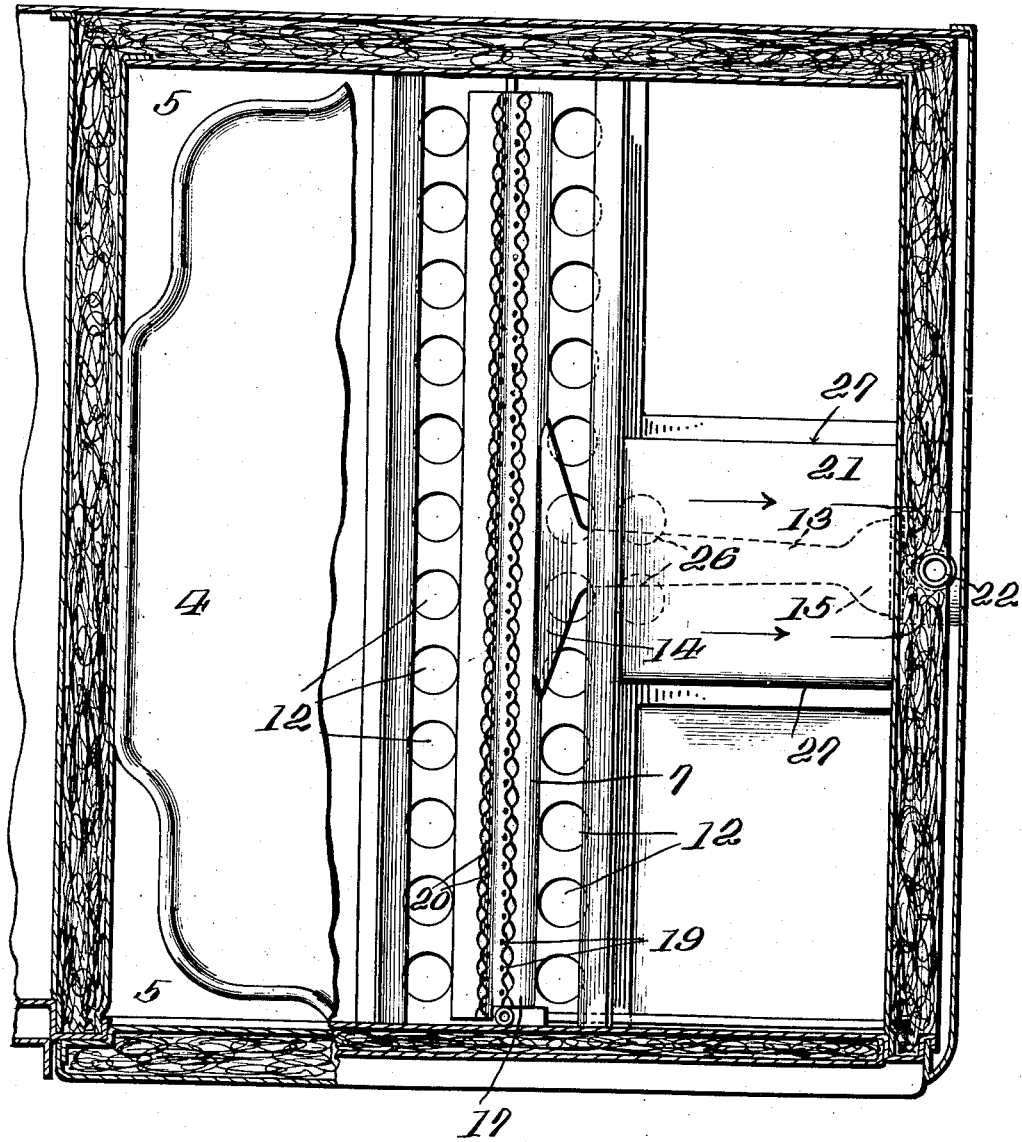

Patented Mar. 12, 1940

2,193,055

UNITED STATES PATENT OFFICE 2,193,055

OVEN AND BURNER THEREFOR

Isaac Vernon Brumbaugh, St. Louis, Mo., assignor to American Stove Company, St. Louis, Mo., a corporation of New Jersey Application July 21, 1936, Serial No. 91,763

7 Claims. (Cl. 126—39)

This invention relates to improvements in ovens and burners therefor, and the primary object of the invention pertains to an especially constructed burner box to receive the improved burner.

Another object of the invention is to construct the burner box with a surrounding enclosure for the said burner, whereby improved results are accomplished.

Another object of the invention is to provide a burner box beneath the oven, said box having an elongated burner enclosure, said enclosure having an elongated opening in its top through which the improved cross-flame of the burner extends; said burner having a mixing tube extending therefrom; said mixing tube being also enclosed and the enclosure having communication at its outer end with the gas manifold, whereby the primary and secondary airs flow through the said enclosure.

A further object of the invention is to provide said burner closure with an elongated open end corresponding to said burner elongation, said bottom of the enclosure having communication through it to the inlet end of a mixing tube, whereby both the primary air for the mixing tube and the secondary air for the burner pass into said closure.

A further object of the present invention is to provide an oven with a burner box beneath it, said burner box having a burner enclosure therein, said enclosure having external communication, said burner having a laterally extending mixing tube, and the enclosure having a housing enclosing said mixing tube, the inlet end of the mixing tube having communication with the said housing whereby both the primary and secondary airs pass through said enclosures.

Further objects of the invention will appear from the following description.

In the accompanying drawings:

Figure 1 is a perspective view of a gas range having an oven and a burner box, said burner box being shown in section, the parts being constructed in accordance with the present invention.

Fig. 2 is a cross section of Fig. 1, taken across the said burner.

Fig. 3 is a horizontal sectional view on the line 3—3 of Fig. 2, looking in the direction indicated by arrows.

Fig. 4 is an enlarged segmental perspective cross-sectional view of parts of the burner.

Fig. 5 is a view taken on the dotted line 5—5 Fig. 2, looking in the direction indicated by arrows.

In carrying out the present invention, the gas range 1, shown in the drawings, is provided with an oven 2, located at one side of the range and beneath the oven 2 is a burner box 3. The location of the oven may be different from that here shown without departing from the scope of the present improvement.

The oven 2 is provided with a bottom 4, and this bottom forms a closure for the oven excepting the vertical passageways 5 located at the corners of said oven, and communicating with the burner box for the purpose hereinafter specified. Located immediately below the said bottom is a member or shield 6 serving to protect the said bottom from the intense heat from the burner flames and serving to distribute the said heat throughout the said bottom 4.

The burner box 3 is provided with an elongated burner 7, which extends substantially throughout the length or depth of the oven 2. In the construction here shown the burner 7 extends transverse the range construction, that is it extends in a direction from the forward to the rear ends of the range construction. I desire it, however, to be understood that this relative position and length of the oven burner is not essential in order to carry out the present improvements. The burner 7 alone forms the subject-matter of my co-pending application filed July 21, 1936, on even date herewith and bearing Serial Number 91,762 and those details thereof will be set forth hereinafter which forms part of the present invention. I reserve the right, however, to add such further illustration and description taken from my co-pending application should necessity therefor arise during the prosecution of this application.

Located in the burner box 3 is an elongated enclosure 8 which extends throughout the depth of the oven, or of a length substantially corresponding to the length of the burner 7. This closure is composed of the side portions 9 Figure 1 and the bottom portion of this enclosure 11 here forming a part of said range. This member or bottom 11 is provided in the form here shown with two parallel rows of openings 12, said openings preferably being at the sides of said burner 7. The burner 7 is provided with a mixing tube 13, which is connected with the burner substantially at its center or may be otherwise located. The inner end 14 of this mixing tube is enlarged laterally where it connects with the said burner. The outer or bell-shaped end 15 of the mixing tube is provided with the usual shutter 16 for controlling the amount of primary air passing to the said mixing tube and thence to the said burner.

The particular form of burner here shown comprises a hollow elongated portion 17 and the top thereof is provided with a depressed V-shaped trough 18. The side walls of this trough are provided with ports 19 and 20 through which the gas issues. The ports 19 and 20 extend through the said inclined walls of the trough so that the flames from the opposite sides extend in opposite inclined directions. The ports 20 and 19 are out of cross-line alignment so that these flames form an X, so to speak, and in this type of burner the ports 19 and 20 are located near enough to each other that the bases of the flames side-swipe each other, whereby the flames are held to or adjacent the ports for the purpose fully set forth in my co-pending application. These flames side-swipe each other so that the flames may be aptly referred to as either side-swiping, or cross flames or X-shaped flames.

Attention is respectfully called to Fig. 2. In this figure a housing 21 for the mixing tube 13 is shown, said housing extending from the outer side of the enclosure 8 to and beyond the inlet or bell-shaped end 15 of said mixing tube. It will thus be observed that the inner end of this housing 21 communicates with the enclosure 8, and that due to this fact all the primary air for the burner is drawn through this housing 21 and it passes into the inlet end of the bell-shaped portion 15 by the said shutter 16. The gas fed to this mixing chamber enters through a gas manifold 22 to the ordinary gas outlet 25. The gas flowing into the mixing tube under ordinary pressure draws the primary air through the openings 12 of said burner enclosure through the housing 21 into the mixing tube so that the primary air and gas are mixed before entering the burner. The gas manifold 22 may or may not be connected with a heat regulator (not shown). Ordinarily in oven constructions a regulating means (not shown) is used for regulating the amount of gas passing into the said mixing tube thereby controlling the size of the flame issuing from the burner. The regulator forms no part of the present invention and hence it is not here shown.

By reference to Fig. 2 the travel of the primary air is indicated by arrows a, and the travel of the primary and secondary air by b. The primary air, as stated, enters the inlet end of the mixing tube as shown in Fig. 2 and travels therein in a reverse direction from its travel in the housing.

By reference to the sectional view Fig. 5, which shows the mixing tube 13 and also the burner 7, the enlargement 14 of the said mixing tube and also the housing 21 are shown. By reference to the plan view Fig. 3, it will be observed that two additional air openings 26 are shown, through which a part of the primary air flows to the housing 21.

By reference to the plan view of Fig. 3, the side walls 27 of the housing 21 are shown and it will be observed that this housing is several times wider than the mixing tube 13. A suitable cap 28 may be provided as shown in Fig. 2, for the purpose of permitting access from the outside to the gas connection or manifold 22.

Referring to the sectional view Fig. 2, it will be observed that all the air for combustion is fed through the openings 12 in the bottom of said burner enclosure that the primary air is prevented from entering the burner box or compartment by directing the primary air, as shown in said figure, and the burnt gases are prevented from mixing with the secondary air by the enclosure walls 9, 21 and 27, as well as mixing with the primary air.

In the construction clearly shown in Figure 2 all the air for the burner—both the secondary air b and the primary air a—passes through the ports 12 within said enclosure and the said primary and secondary air flows through said burner enclosure as shown in dotted lines in said Figure 2. In this way only absolutely pure air is supplied for the primary and secondary air in the operation of the burner, and that part of the air flowing through said stem of the enclosure and entering the outer end of the mixing tube 13 constitutes the primary air. Were it not for said enclosure and the said ports all the air for the burner operation would enter said burner box 3 and it would vitiate or contaminate the air passing therein by the products of combustion contained within said burner box 3. The burner enclosure therefore with its air ports prevents such contamination of the secondary air and also of the primary air.

As heretofore stated, by using the corner passages between the burner compartment and the oven above, instead of using the usual side flues is advantageous. By this construction hot gases are permitted only to pass to the oven above through the said corners and the hot gases are directed upward into each corner of the oven chamber thus causing circulation of the hot gases which results in even distribution of heat in the oven from the burner compartment. With an oven having only this corner communication and doing without the side flues, a utensil containing food can be placed close to the sides of the oven without causing unequal baking or cooking. With ovens having side flues, it has been the general practice not to place the utensil closer than about one inch from the side flues as burning generally results.

It will be understood by those skilled in the art that any suitable form of ignition device may be used in connection with the burner 7. Since the ignition forms no part of the present invention one is not here shown. Any desired form of constantly burning pilot light may also be used for lighting the said burner.

Attention is here directed to the form of the outlet end 29 through which the flames from the burner 7 burns. The outlet end is provided with the outwardly flared portion shown which has some effect upon the flames issuing from the said burner. That is to say, the outlet 29 is flared outwardly for the purpose of directing the secondary air to the flames in an outwardly flaring direction corresponding to the said flared outlet and also prevents the burned gases from flowing back to the flames.

It will be observed from the foregoing that the said burner and mixing tube constitute a T-shaped construction and the burner enclosure and the portion extending at right angles thereto corresponds to the mixing tubes and constitutes a T-shaped enclosure for the said burner; the outer ends of the mixing tube and said stem of the enclosure having communication whereby both primary and secondary air is fed through the enclosure as set forth.

I claim:

1. The combination in a gas range having a burner box of a T-shaped burner enclosure within the burner box, the cross arm of the T having an open top and the stem of the T extending substantially to the outer wall of the burner box, and a T-shaped burner in said enclosure, the cross arm of the T having gas ports and the stem of the T forming a mixing tube the outer end of which is open and in communication with the outer end of the stem of said enclosure, the cross arm of the T-shaped enclosure provided with air passages the parts combined substantially as set forth.

2. The combination in a gas range having an oven and a burner box therebelow, of a burner having an extended horizontal portion provided with gas ports and also with an extended mixing tube located wholly within said burner box and having its inner end connected with and in communication with said burner portion, and an enclosure having an open top with its walls extending above said burner and enclosing said burner and mixing tube, said enclosure placed within the said burner box, and said enclosure having air ports communicating outside of said burner box and the outer end of the said mixing tube having also communication with the said air ports of said enclosure, whereby primary air is supplied to the outer end of the mixing tube, and secondary air is supplied for the flame from said burner through said air ports.

3. In a gas range the combination of a burner box, of an enclosure for a burner, said enclosure having a main portion with an open top and a laterally extending portion closed apart from said main portion and having its side and top walls closed, a burner and a mixing tube within said enclosure and both of less cross-sectional diameter than the said enclosure, air passages into the said enclosure for supplying primary and secondary air for the burner, said burner having parallel rows of the gas ports arranged in staggered relation within said enclosure and below said open top and the ports of one row extending across the ports of the other row, said ports being at an angle extending above said open top to direct the flames across each other and through the open top without engagement therewith, for the purpose set forth.

4. In a gas range comprising a housing having an oven, a burner box below said oven, a burner within said box having crosswise oppositely extending gas ports producing oppositely extending cross flames, said burner provided with a mixing tube extending at right angles thereto and communicating therewith, a burner enclosure having an upper open end formed by walls extending parallel with but separated from said burner and extending above the upper portion of the said burner, an enclosure for said mixing tube within said oven and separated therefrom to form a closed air space having the outer end of said space in communication with the inlet end of said mixing tube and its inner end in closed communication with said burner enclosure, said mixing tube enclosure provided with air openings forming communication outside of said enclosure, whereby clean air for both primary and secondary operations of the burner flames is obtained independently of the said products of combustion within the said burner box.

5. The combination with a gas range having an oven and a burner box, a T-shaped burner having its main portion provided with gas ports and the stem portion of said T at its inner end communicating with the said main portion and its outer end open, a T-shaped enclosure for the main portion of said T consisting of parallel walls extending above said burner, and its stem portion entirely enclosing the stem portion of the T burner, the outer ends of the stems of both the burner and the enclosure having communication, said main portion of said main enclosure provided with air ports communicating exterior of said burner box whereby clean air supply for both the primary and secondary needs of the burner are provided.

6. In a gas range the combination with a burner box of a burner enclosure having an elongated main portion provided with an elongated burner within said enclosure, the ports extending upwardly and outwardly crosswise the burner and said open top of the enclosure, said burner being wholly below said enclosure having its upper ends flared outward and said burner having a vertical cross section substantially half that of said enclosure and the angles of said gas ports drawn beyond said open top and causing said cross flames to miss the open top and to burn beyond said crossing point and a mixing tube communicating with said burner, whereby cross flames are provided with secondary air spaces between them and the said open top.

7. In a gas range the combination with a burner box of an elongated open top enclosure consisting of parallel vertical walls, an elongated hollow burner placed wholly within said enclosure and having its face provided with an elongated depression, a mixing tube for said burner, the cross section of said burner being substantially half the cross section of said enclosure having its upper ends flared outward, said burner provided with gas ports extending from opposite walls of said depression, the gas ports extending at an angle missing said open top whereby the flames from said ports escape said open top and burn individually in the manner as shown.

ISAAC VERNON BRUMBAUGH.